(12) United States Patent
Aoki

(10) Patent No.: US 6,298,021 B2
(45) Date of Patent: Oct. 2, 2001

(54) OPTICAL DISC AND OPTICAL DISC APPARATUS FOR FORMING WOBBLED TRACKS

(75) Inventor: Ikuo Aoki, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/750,112

(22) Filed: Dec. 29, 2000

Related U.S. Application Data

(62) Division of application No. 09/407,852, filed on Sep. 29, 1999, now Pat. No. 6,201,773, which is a continuation of application No. 08/919,255, filed on Aug. 28, 1997, now Pat. No. 5,999,504.

(30) Foreign Application Priority Data

Aug. 29, 1996 (JP) .................................................... 8-228048

(51) Int. Cl.[7] ...................................................... G11B 7/00
(52) U.S. Cl. .................. 369/47.1; 369/44.13; 369/53.41; 369/275.3
(58) Field of Search ............................... 369/47.1, 47.15, 369/53.1, 53.44, 53.41, 59.1, 59.12, 59.2, 275.1, 275.3, 275.4, 44.13, 44.27, 44.28, 32

(56) References Cited

U.S. PATENT DOCUMENTS

| 5,444,687 | 8/1995 | Okumura . |
| 5,809,006 | * 9/1998 | Davis et al. ...................... 369/47.49 |
| 6,069,870 | 5/2000 | Maeda et al. . |

* cited by examiner

*Primary Examiner*—Muhammad Edun
(74) *Attorney, Agent, or Firm*—Dickstein Shapiro Morin & Oshinsky LLP

(57) ABSTRACT

An optical disc and associated recording/reproducing apparatus is described which creates and reads wobbled tracks on the optical disc. Wobbled tracks are formed in correspondence to a wobble signal which is phase modulated with address information. Phase modulation is used to convert the address information to the wobble signal. The carrier to noise ratio (C/N) of the address information is good, and it is possible to shorten the wobbling amplitude of the tracks while maintaining addressing capabilities. It is thus possible to arrange the track pitch in a high density, and increase the recording capacity of the optical disc.

13 Claims, 6 Drawing Sheets

OPTICAL DISC AND OPTICAL DISC APPARATUS FOR FORMING WOBBLED TRACKS

This application is a divisional of application Ser. No. 09/407,852, filed Sep. 29, 1999, now U.S. Pat. No. 6,201,773, which is a continuation of application Ser. No. 08/919,255, filed Aug. 28, 1997, now U.S. Pat. No. 5,999,504.

BACKGROUND OF THE INVENTION

1. Field of the Invention

The present invention relates to an optical disc (like a CD (compact disc) or a DVD (digital video disc)), and an optical disc apparatus which carries out at least recording or reproducing information on the optical disc.

2. Description of the Related Art

Recently, optical discs have been developed as a widely used recording media, the CD is a representative one of them. It is a reproducing only disc which contains sound or other signals recorded as digital data. At present, there are also CD-WO, which can be rewritten, and CD-RAM, which can be erasable.

As control methods of an optical disc rotating speed, there are CAV (Constant Angular Velocity) which has constant angular speed (attaching importance to access speed), and CLV (Constant Linear Velocity) which has constant linear velocity (attaching importance to recording capacity). A music CD, for example, adopts the CLV method for the purpose of reproducing music originally. Spiral tracks are scanned at a constant linear velocity.

In the case of a music CD (also termed a CD-DA (Digital Audio)) of a reproducing-only type, CLV control can be carried out by synchronizing a rotating speed with the reproducing frequency of digital data. However, in case of CD-WO or CD-RAM, the above mentioned CLV control can not be carried out because digital data is not initially recorded on the tracks. For such recording discs, like a CD-WO, grooves showing track position are wobbled with a constant cycle in correspondence to address information. The CLV control is carried out by reproducing a wobble signal from a tracking signal of the grooves.

For example, FIG. 10 shows an optical CD-WO disc 1. In order to form spiral tracks which carry reproducing and recording information, the grooves 2 which are the tracks, are formed with a predetermined pitch. They are wobbled in correspondence to address information. Lands 3 are located between the grooves 2 and are not used as tracks.

In more detail, as shown in FIG. 11, the address information, which comprises binary data, after being converted to bi-phase code, it is converted to a wobble signal by frequency modulation. In this situation, "0" of the address information is converted to "0,0" of the bi-phase code. "1" of the address information is converted to "1,0" of the bi-phase code. Further, a "0" of the bi-phase code is converted to a sine wave of frequency 21.05 KHz by the frequency modulation while a "1" of the bi-phase code is convened to a sine wave of frequency 23.05 KHz by the frequency modulation.

When an optical disc apparatus carries out recording and reproducing information on such an optical disc, the grooves 2-are scanned by the optical head. As the grooves 2 are wobbled by a frequency which is very different from a tracking error signal, it overlaps the tracking error signal and ATIP (Absolute Time In Pre-groove) wobble signal.

An address reproducing circuit 4 of the optical disc apparatus, as shown in FIG. 12, derives the ATIP wobble signal from the tracking signal by a band pass filter 5. If the ATIP wobble signal is digitized with a threshold value of 22.05 (KHz) by a frequency detector 6, bi-phase code is restored. Thus, address information is decoded from the bi-phase code, and can be used as a synchronizing signal to control a rotating speed of the optical disc 1, ensuring that the grooves 2 move relative to the optical head with constant linear speed.

An optical disc like the above mentioned CD has the address information recorded by wobbling tracks. Therefore, the recording area of the tracks is not used for recording the address information, and the recording area of the tracks is fully used for recording data.

However, with such an optical disc, it is impossible to record long time image data with high quality. Therefore, an increased recording capacity is desired. Though it has been considered to arrange tracks in high density, when arranging the wobbled tracks in high density, tracks which are adjacent to a laser spot (for detecting the tracks optically) interface. Therefore, the S/N (Signal-to Noise ratio) of the tracking signal is lowered.

To solve this problem, the present inventors have considered a method which seeks to compress the wobbling amplitude of the tracks in proportion to a arrangement pitch. In this situation, the C/N (Carrier to Noise ratio) of the wobble signal falls and decoding accuracy of the address information falls. In the present optical disc, it is impossible to increase recording capacity while maintaining the track arrangement in high density, with both good S/N of the tracking signal and good C/N of the wobble signal.

SUMMARY OF THE INVENTION

In accordance with a first aspect of the invention, there exists an optical disc which has wobbled tracks in correspondence to address information. The tracks are wobbled in correspondence to a wobble signal which is a phase modulation of the address information. Accordingly, when recording and reproducing information while scanning tracks of the optical disc, the address information is decoded by detecting phase while deriving the wobble signal from the tracking signal. The phase modulation has a lower error producing rate compared with frequency modulation and amplitude modulation, and it has high S/N and C/N. Therefore, even with a shortening of a wobbling amplitude of the tracks, the address information can be restored. An optical disc like this includes a Read only disc (e.g. CD), a rewriting disc (e.g. CD-WO), or an erasable disc (CD-RAM), the tracks of these discs induding pit arrangement grooves and lands.

In accordance with a second aspect of the invention, after the address information is converted to a predetermined code, phase modulation is carried out by the first structure. The code determines the phase modulation of the wobble signal. As such, predetermined code, such as Manchester code can be used.

In accordance with a third aspect of the invention, one bit of the address information corresponds to an integral cycle of the wobble signal in the first or second structure. Therefore, the duty ratio of the phase modulated wobble signal of the address information is constant.

In accordance with a fourth aspect of the invention, binary data of the address information corresponds to 0 and 180 degree phase of the wobble signal in the first or second structure. Therefore, even if phase of the wobble signal reverses, the amplitude of starting point and ending point becomes "0". Accordingly, even if binary data of the address information changes, the wobbled track continues without interruption.

In accordance with a fifth aspect of the invention, binary data of the address information and phase of the wobble signal are in a one-to-one correspondence in the first structure or second structure. Therefore, by detecting phase of the address information, binary data of the address information is restored.

In accordance with a sixth aspect of the invention, binary data of the address information and existence of phase reversal of the wobble signal are in a one-to-one correspondence in the first structure or second structure. Therefore, by judging the existence of the phase reversal of the wobble signal, binary data of the address information can be detected.

In accordance with a seventh aspect of the invention, the phase of the wobble signal reverses in correspondence to producing of the predetermined one of binary of the data of the address information in the sixth structure. Therefore, by judging existence of the phase reversal of the wobble signal, binary data of the address information can be detected.

In accordance with an eighth aspect of the invention, a carrying wave frequency of the phase modulation of the address information is located at an intermediate position between a tracking servo band area and a RF signal band area in the first or second structure. Therefore, the wobble signal, the tracking error signal and the RF signal can not interfere with each other, and are reproduced separately.

In accordance with a ninth aspect of the invention, an optical disc apparatus has a rotating driving mechanism for rotating an optical disc with tracks wobbled in correspondence to the address information, an optical head for detecting at least a tracking signal by scanning the tracks of the optical disc, a band pass filter which derives a wobble signal of special frequency band from the tracking signal, and a phase detector which restores the address information by detecting the phase of the wobble signal. Accordingly, when carrying out recording or reproducing information by scanning the track wobbled in correspondence to the address information of the optical disc, the optical disc is rotated by the rotating driving mechanism. The tracks of the rotating optical disc are scanned by the optical head and a tracking signal is detected. The wobble signal of a special frequency band is derived from the tracking signal by the band pass filter. The address information can be detected when the wobble signal is detected by the phase detector. In short, even if the tracks of the optical disc are wobbled in correspondence to the phase modulated wobbled signal of the address information, the address information can be restored by deriving the wobble signal from the tracking signal. The phase modulation has a low error producing rate and S/N and C/N are high, as compared with frequency modulation or amplitude modulation. Therefore, even while shortening wobbling amplitude of the track of the optical disc, the address information can be restored. This optical disc apparatus may be applied to a disc recorder recording information on the optical disc, or a disc player reproducing information on the optical disc, or a disc drive which carries out recording, reproducing and erasing information on the optical disc.

In accordance with a tenth aspect of the invention, an optical disc apparatus has a rotating driving mechanism for rotating an optical disc with tracks wobbled in correspondence to address information, an optical head which detects at least a tracking signal by scanning tracks of the rotating optical disc, a band pass filter which derives a wobble signal of a special frequency band from the tracking signal, a delay circuit which delays the wobble signal only for a predetermined time, a multiplying circuit which multiplies a non-delayed wobble signal by the delayed signal, and a low pass filter which smoothes the multiplied signal. When scanning the wobble tracks in correspondence to address information of an optical disc, and carrying out recording and reproducing information, the optical disc is rotated by the rotating driving mechanism. The tracks of the rotating optical disc are scanned by the optical head, and a tracking signal is detected. A special frequency band signal is derived from the tracking signal by the band pass filter. The wobble signal is delayed only for predetermined time by the delay circuit. The delayed signal is multiplied the non-delayed wobble signal by the multiplying circuit. The multiplied signal is smoothed by the low pass filter. In short, even if the tracks of the optical disc are wobbled as binary data of the address information and the existence of phase reversal of the wobble signal are one-to-one correspondence, the wobble signal derived from the tracking signal and the address information can be restored. Phase modulation has a low error producing rate and a high S/N and C/N as compared with frequency modulation or amplitude modulation. Therefore, even if a wobble amplitude of the optical disc tracks is shortened, the address information can be restored.

In accordance with an eleventh aspect of the invention, an optical disc apparatus has a rotating driving mechanism for rotating an optical disc, an optical head which forms tracks by scanning the rotating optical disc, a rotating control circuit which controls rotating speed of the rotating driving mechanism in correspondence to the track address information so that relative speed between the optical head and the optical disc can be constant, a phase modulator which reproduces a wobble signal by modulating phase of address information of the optical disc track, and a head control circuit which moves a scanning position of the optical head in correspondence to the wobble signal in a radial direction of the optical disc. Accordingly, when forming tracks wobbled in correspondence to the address information on the optical disc, the optical disc is rotated by the rotating driving mechanism, and tracks are formed on the rotating optical disc by the rotating driving mechanism. Then, the rotating speed of the rotating driving mechanism is controlled in correspondence to the address information of the tracks by the rotating control circuit. Therefore, relative speed between the optical head and the optical disc is constant. Further, the address information of the optical disc track is carried out by phase modulation and a wobble signal can be reproduced. The scanning position of the optical head is moved in a radial direction of the optical disc by the head control circuit in correspondence to the wobble signal. In short, there were formed tracks wobbled on the optical disc in correspondence to the phase modulated wobble signal of the address information. Therefore, when manufacturing an optical disc, tracks of the optical disc become tracks wobbled in correspondence to a phase modulated wobble signal of the address information. When carrying out recording and reproducing information by scanning tracks of the optical disc, a wobble signal is derived from the tracking signal and address information is restored. The phase modulation has a low error reproducing rate and a high S/N or C/N as compared with frequency modulation or amplitude modulation. Therefore, even if a wobble amplitude of the track of the original optical disc is shortened, address information is restored. The above optical disc includes a disc base manufactured as an optical disc, a disc stamper used for large quantity manufacturing of the optical disc, a stamper master used for manufacturing the disc stamper, and a photo mask used for manufacturing disc stamper.

In accordance with a twelfth aspect of the invention, the phase modulator reverses phase of the wobble signal in correspondence to one of binary data of the address information in the eleventh structure. Therefore, the binary data of the address information and the existence of reversal of the wobble signal are in a one-to-one correspondence with each other.

Further, objects and advantage of the present invention will be apparent from the following description of the preferred embodiments which is provided in conjunction with the accompanying drawings.

DESCRIPTION OF THE PREFERRED EMBODIMENTS

The preferred embodiments of a disc loading apparatus in the present invention will next be described in detail with reference to the accompanying drawings.

Figure 12:
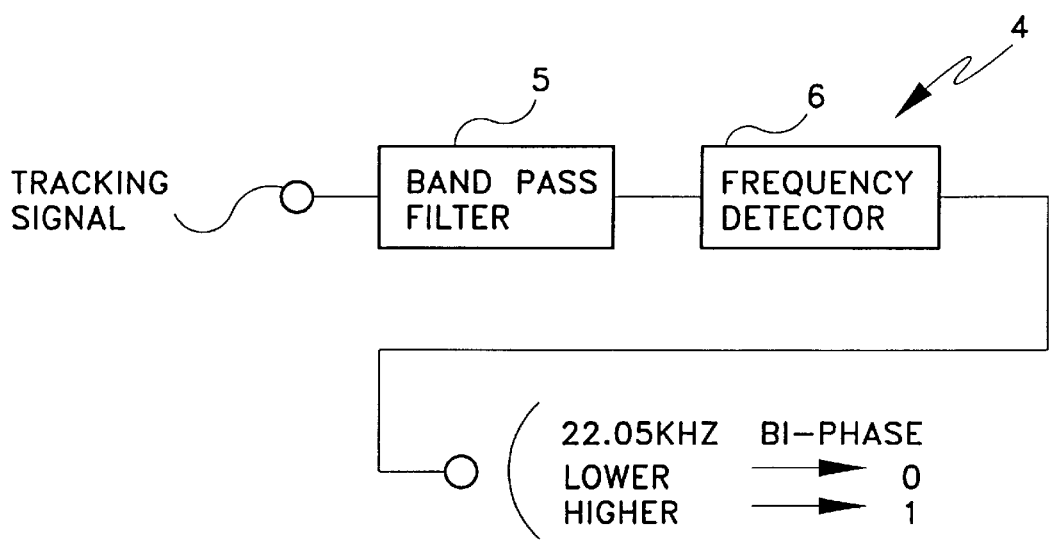
FIG. 12 is a block diagram showing a conventional address reproducing circuit.

The first embodiment of the present invention will be described in detail with reference to FIGS. 1–5. In the present embodiment the same names and same reference numerals are used to refer to the same parts as in the FIG. 12 conventional apparatus.

Figure 2:
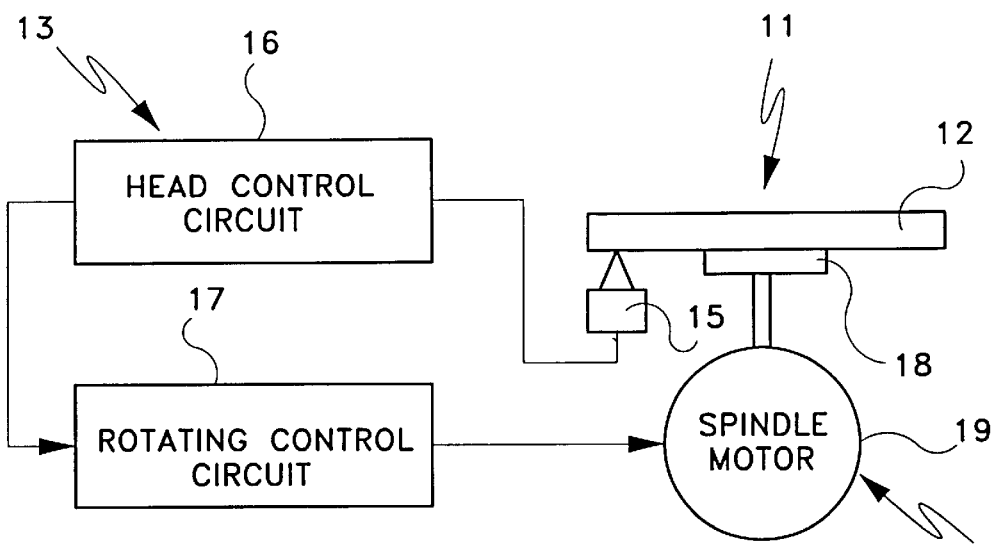
FIG. 2 is a view showing an optical disc apparatus in accordance with the first embodiment of the present invention.
Figure 10:
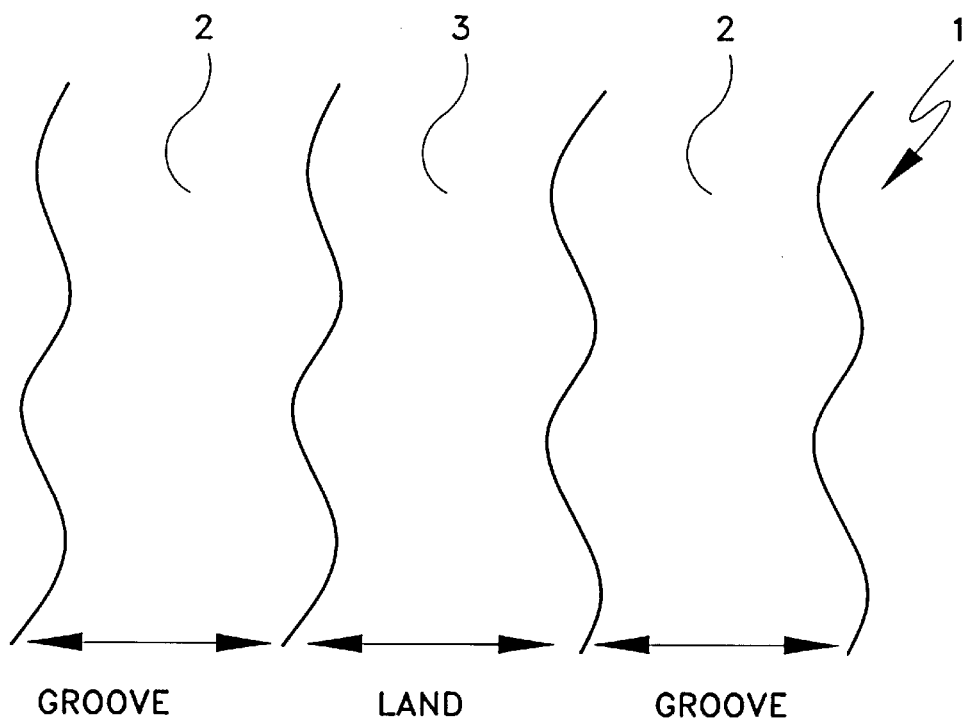
FIG. 10 is a outline view showing lands and grooves of a conventional optical disc.
Figure 11:
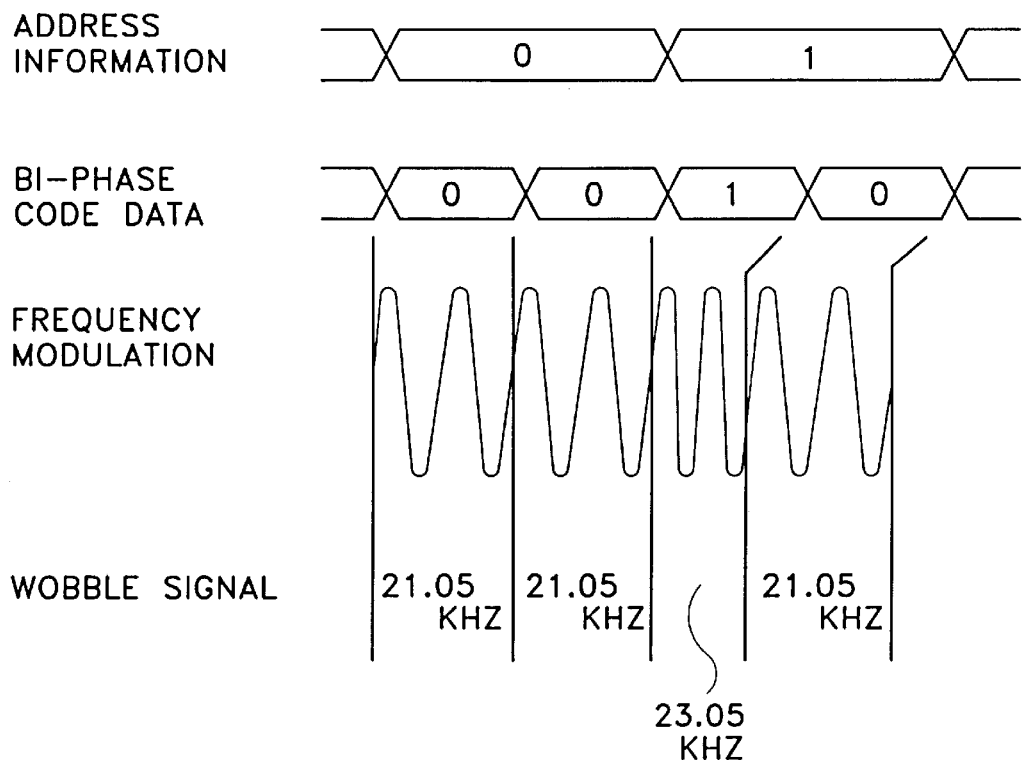
FIG. 11 is a time chart showing the relationship between address information of the optical disc, a bi-phase code, and a wobble signal.

An optical disc system 11 of the present embodiment comprises an optical disc 12 and an optical disc drive 13 of an optical disc apparatus as shown FIG. 2. The optical disc 12 of the present embodiment is formed as erasable type optical disc by the CLV method. Grooves 2 which become tracks are wobbled in correspondence to the address information (See FIG. 10). The wobbling corresponds to the phase modulated wobble signal containing the address information. In this optical disc 12, one bit of the address information corresponds to two codes of the wobble signal. A "0"/"1" value of the address information corresponds 0/180 degree phase shift of the wobble signal. The carrying wave of the phase modulated wobble signal is a sine wave. The frequency of this sine wave is located between the tracking servo band and RF signal band.

An optical disc drive 13 of the present embodiment which carries out recording and reproducing information on the optical disc 12 has a rotating driving mechanism 14, an optical head 15, a head control circuit 16, and a rotating control circuit 17 as main parts. The rotating driving mechanism 14 has a turntable 18 holding the optical disc 12. and a spindle motor 19 for rotating the turntable 18. The optical disc 12 is rotated by the CLV method.

The optical head 15 has a laser source, an object lens, a beam splitter, and a photo detector. The recording and reproducing of information is carried out by scanning the grooves 2 of the optical disc 12. The optical head 15 is movably supported in the tracking direction by a seek mechanism. In this optical head 15, the object lens is supported in each direction by the tracking mechanism (not shown) and the focusing mechanism (also not shown).

The head control circuit 16 is connected to the optical head 15, and carries out disposal of each kind of information in relation to either recording or reproducing information by the optical head 15. In short, it restores an output signal of the photo detector, and controls driving the laser source, the seek mechanism, the tracking mechanism, and the focusing mechanism. For example, when recording information, it drives the laser source of the optical head 15 in correspondence to the recording information. In the same way, when reproducing information, it decodes the RF signal from the output signal of the photo detector of the optical head 15, while carrying out tracking control or focusing control.

Figure 3:
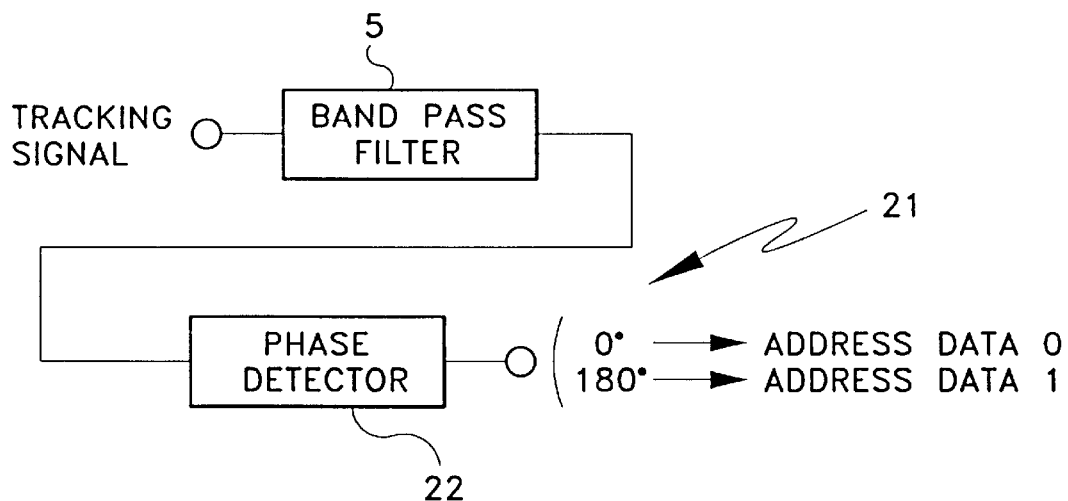
FIG. 3 is a block diagram showing an address reproducing circuit of the optical disc apparatus.
Figure 4:
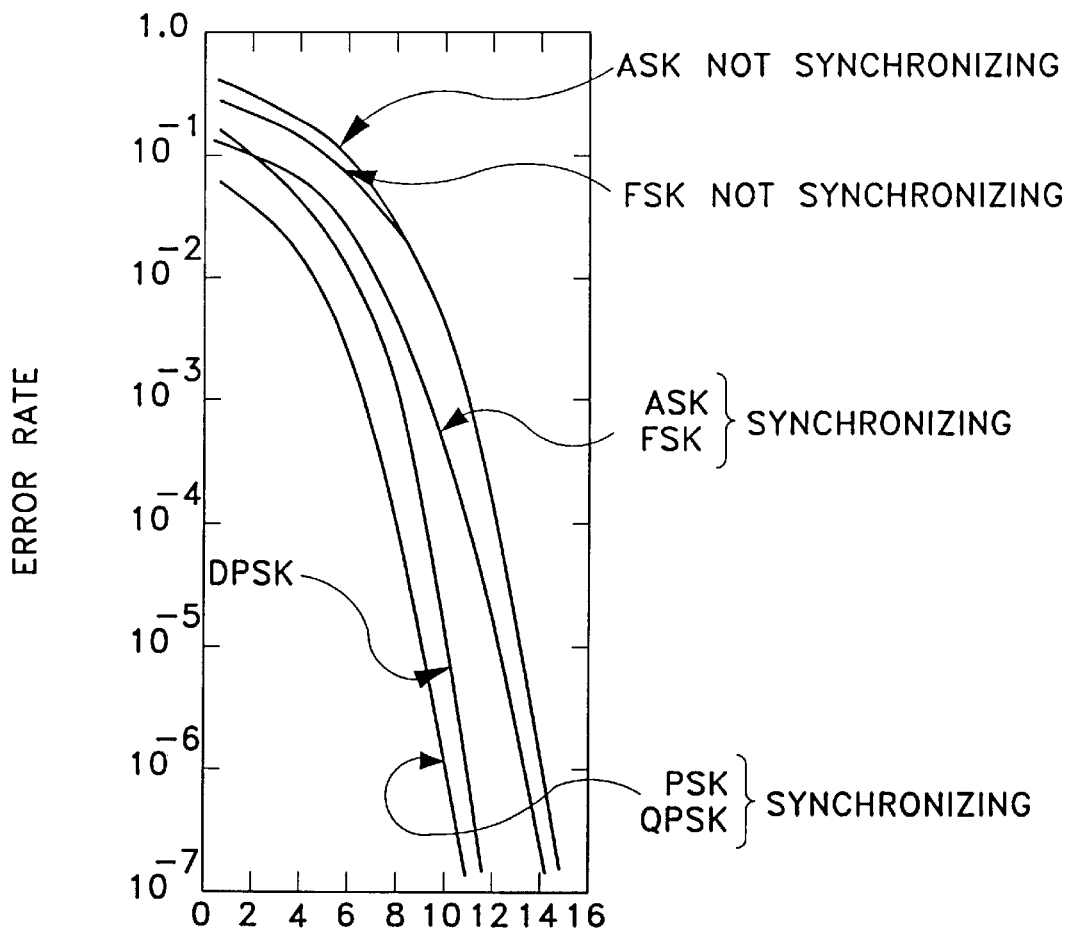
FIG. 4 is a view showing each kind of modulation method.

The head control circuit 16 has an address reproducing circuit 21 (FIG. 3) which reproduces address information of the grooves 2 of the optical disc 12. The address reproducing circuit 21 has a band pass filter 5 and a phase detector 22 as shown in FIG. 3. As mentioned above, when the head control circuit 16 carries out tracking control of the optical head 15, the tracking signal detected by the optical head 15 is input to the address reproducing circuit 21. In that case, the band pass filter 5 derives a wobble signal which is of a special frequency band from the tracking signal. Then, the phase detector 22 restores the address information by detecting phase of the wobble signal.

The rotating control circuit 17 (FIG. 2) is connected with the head control circuit 16 and the spindle motor 19. It controls the rotating speed of the spindle motor 19 by the CLV method, and in correspondence to the address information input from the address reproducing circuit 21 of the head control circuit 16. In more detail, the rotating control circuit 17 has PLL (Phase Locked Loop) circuit and reproduces a target speed for rotating the optical disc 12 from address information input from the head control circuit 16. Further, it adjusts the rotating speed of the spindle motor 19 to the target speed by PLL control.

In this structure, the optical disc system 11 of the present embodiment the optical disc 12 is placed into the optical disc drive 13 so that it can exchange information. The optical disc drive 13 can record and reproduce information on the optical disc 12 inserted in this way.

In this situation, the optical disc 12 is rotated by the rotating driving mechanism 14 of the optical disc drive 13. First, the optical head 15 carries out the recording or reproducing of information on the grooves 2 of the rotating optical disc 12. Then, the head control circuit 16 detects the tracking signal and the focusing signal from the output signal of the optical head 15 which scans the wobbled grooves 2. Therefore, the optical head 15 follows the grooves 2 in accordance with these signals.

As the same time, the head control circuit 16 detects the wobble signal from the tracking signal and outputs it to the rotating control circuit 17. Therefore, the rotating control circuit 17 fixes the linear speed of the optical disc for the optical head 15, by feedback control of the rotating speed of the spindle motor 19 to make it constant with the frequency of the wobble signal.

Still, in the optical disc system 11 of the present embodiment, the grooves 2 of the optical disc 12 are wobbled in correspondence to the phase modulated wobble signal of the address information. Therefore, the same process that is used in the conventional example can not reproduce the address information. Then, the address reproducing circuit 21 derives the wobble signal of a special frequency band from the tracking signal by the band pass filter 5, and restores address information by detecting the phase of the wobble signal with the phase detector 22.

In the optical disc system 11 of the present embodiment, as is mentioned above, the wobbling of the grooves 2 of the optical disc 1 corresponds to the phase modulated wobble signal of the address information, and the disc drive 13 restores address information by detecting the phase of wobble signal detected from the optical disc 12. In this way, binary data of the address information is modulated by phase, and the phase of the wobble signal is changed to from 0 to 180 degrees, respectively. Therefore, this phase modulation can be said to be PSKC (Phase Shift Keying) modulation. The PSK method, as shown FIG. 4, has low error reproducing rate, as well as high S/N and C/N, as compared with the PSK (Frequency Shift Keying) method or the ASK (Amplitude Shift Keying) method, which decode the address information from the frequency of the conventional wobble signal.

In other words, the optical disc system 11 of the present embodiment modulates the phase of the address information and reproduces the wobble signal. Therefore, the wobbling amplitude of the grooves 2 of the optical disc 12 can be shortened, while holding the C/N required for reproducing the address information. In this way, when the wobbling amplitude of the grooves 2 is shortened, the S/N of the reproducing signal can not be reduced even if the pitch of the grooves 2 is of a high density. Therefore, recording capacity of the optical disc 12 can be increased while maintaining the S/N ratio.

In the optical disc 12 of the present embodiment binary data of the address information and the wobble signal are one-to-one correspondence. Therefore, the optical disc drive 13 can restore binary data of the address information by only detecting the phase of the wobble signal. Therefore, the address information can be reproduced at high speed by the address reproducing circuit 21 with case.

Figure 1:
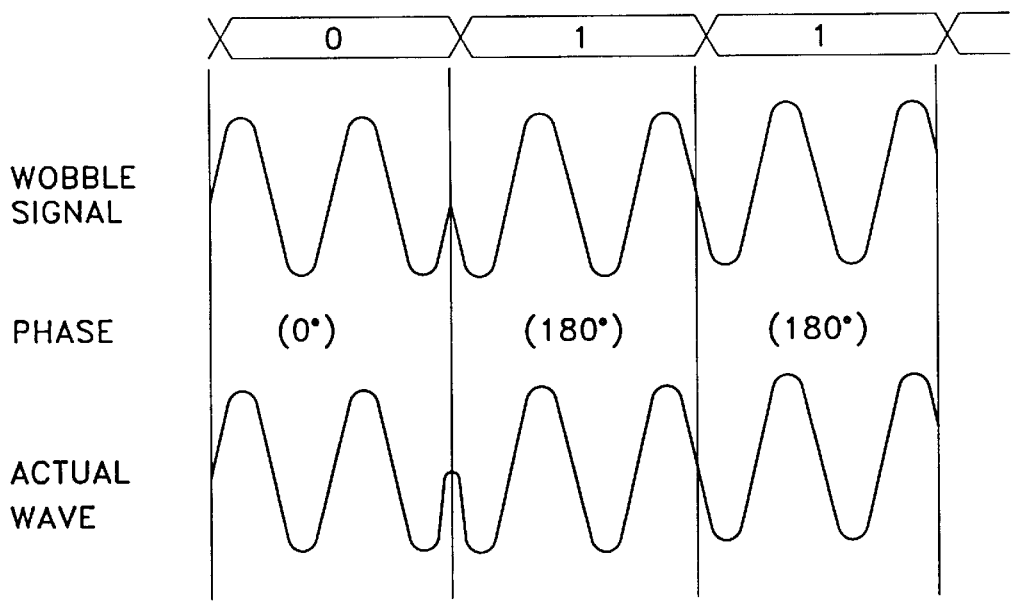
FIG. 1 is a time chart showing the relationship between address information of an optical disc, a theoretical wobble signal and an actual wobble signal in accordance with first embodiment of the present invention.

Binary data 0/1 of the address information corresponds to 0/180 degree phase of the wobble signal. Therefore, as shown in FIG. 1, even if phase of the wobble signal reverses, the amplitude of a start point and an end point becomes "0". Even if binary data of the address information changes, the wobble grooves 2 are continued without a break. Still, when detecting the wobble signal by actually forming the grooves 2 like this, as shown in FIG. 1, wave form of the wobble signal is attenuated at position where phases reverse, however this is not a problem.

In the optical disc 12 of the present embodiment one bit of the address information corresponds to two codes of the wobble signal. Therefore, duty ratio of the wobble signal for the binary data of the address information does not change. Accordingly, as is necessary in the conventional CD, it is unnecessary to convert the address information into the bi-phase code before changing it into the wobble signal for reducing difference of the duty ratio. The optical disc drive 13 can convert the wobble signal into the address information directly. Therefore, the burden of disposal is small and disposal speed is high. Since the duty ratio of the wobble signal is constant it is unnecessary to consider the influence of the DC component of the wobble signal in case of reproducing the wobble information. The optical disc drive 13 can easily reproduce the address information from the wobble signal.

Figure 5:
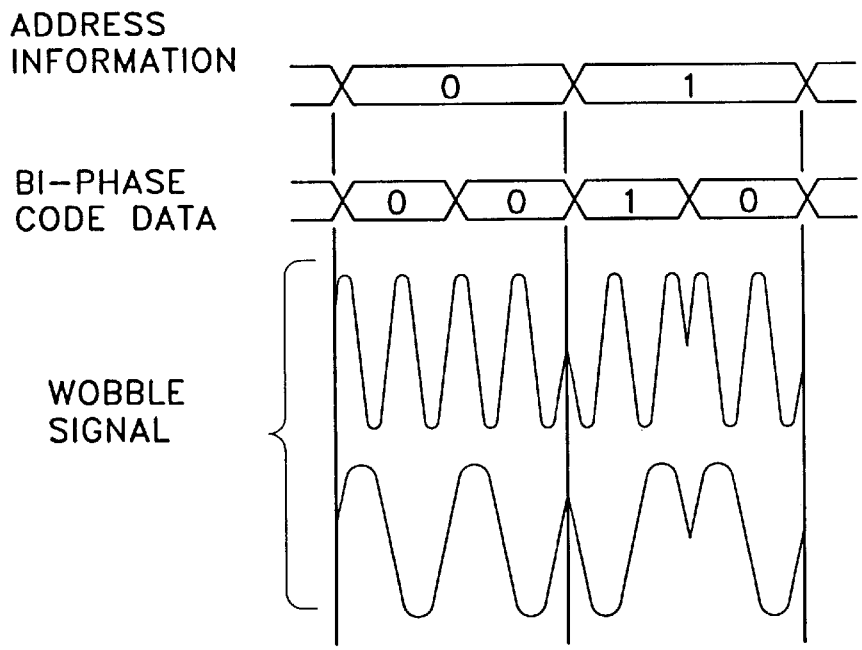
FIG. 5 is a time chart showing the relationship between address information, bi-phase code of a predetermined code, and a wobble signal in accordance with the first embodiment of the claimed invention.
Figure 6:
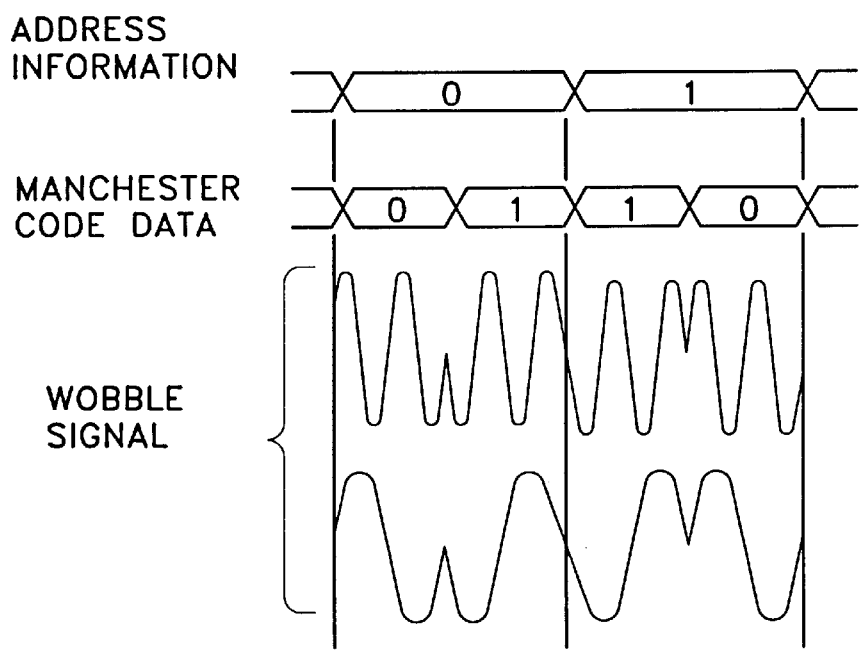
FIG. 6 is a time chart showing the relationship between address information, a Manchester code of the predetermined code, and a wobble signal.

However, the present invention is not limited by the above embodiment, and it can be transformed variably. For example, as shown in FIG. 5 and FIG. 6, it is possible to reproduce the wobble signal by phase modulation after converting the address information into a predetermined code like bi-phase code or Manchester code. For example, if carrying out code converting like this, reproducing frequency of one of binary data or frequency of the carrying wave can be adjusted, design flexibility of the optical disc 12 can be improved.

In the above embodiment one bit of the address information corresponds to two cycles of the wobble signal. However, it need only correspond to an integral cycle, alternately it can correspond to one cycle or four cycles.

Figure 7:
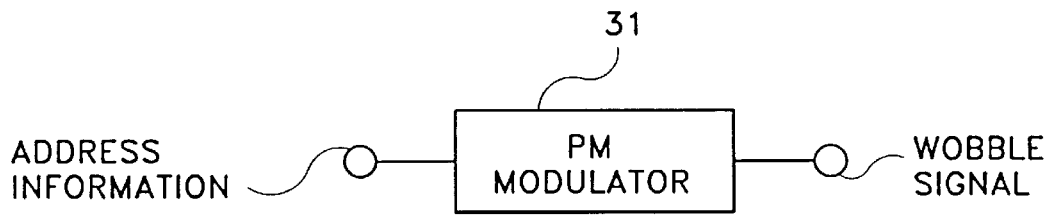
FIG. 7 is a block diagram showing a phase modulator used as a phase modulating means in a cutting apparatus of the optical disc apparatus.

Next, a cutting apparatus which is an optical disc apparatus for forming the above wobbled grooves on an optical disc will be explained with reference to FIG. 7. The cutting apparatus has a rotating driving mechanism 14, an optical head 15, and a head control circuit 16 as in the above mentioned optical disc drive 13. Further, it has a phase modulator 31.

The rotating driving mechanism 14 rotates the original optical disc, the optical head forms grooves on the rotating optical disc. The rotating control circuit 17 controls the rotating speed of the rotating driving mechanism 14 in correspondence to the address information of the grooves, and the relative speed between the optical head and the original optical disc can be constant. The phase modulator 31 modulates the phase of the address information of the grooves and reproduces the wobble signal. The head control circuit 16 moves the scanning position of the optical head in a radial direction in correspondence to the wobble signal.

In this structure, the above cutting apparatus forms phase modulated wobbled grooves in an optical disc in correspondence to the address information. If a disc stamper is made from the optical disc, then it is possible to manufacture optical discs having wobble grooves in large quantities.

In the optical disc 12 of the present embodiment, the duty ratio of the wobble signal for binary data containing the address information does not change. Therefore, the cutting apparatus forming grooves on the above original optical disc can be directly converted to the address information of the wobble signal without converting it to a predetermined code, therefore the burden of the disposal is reduced, and disposal speed is high.

Figure 8:
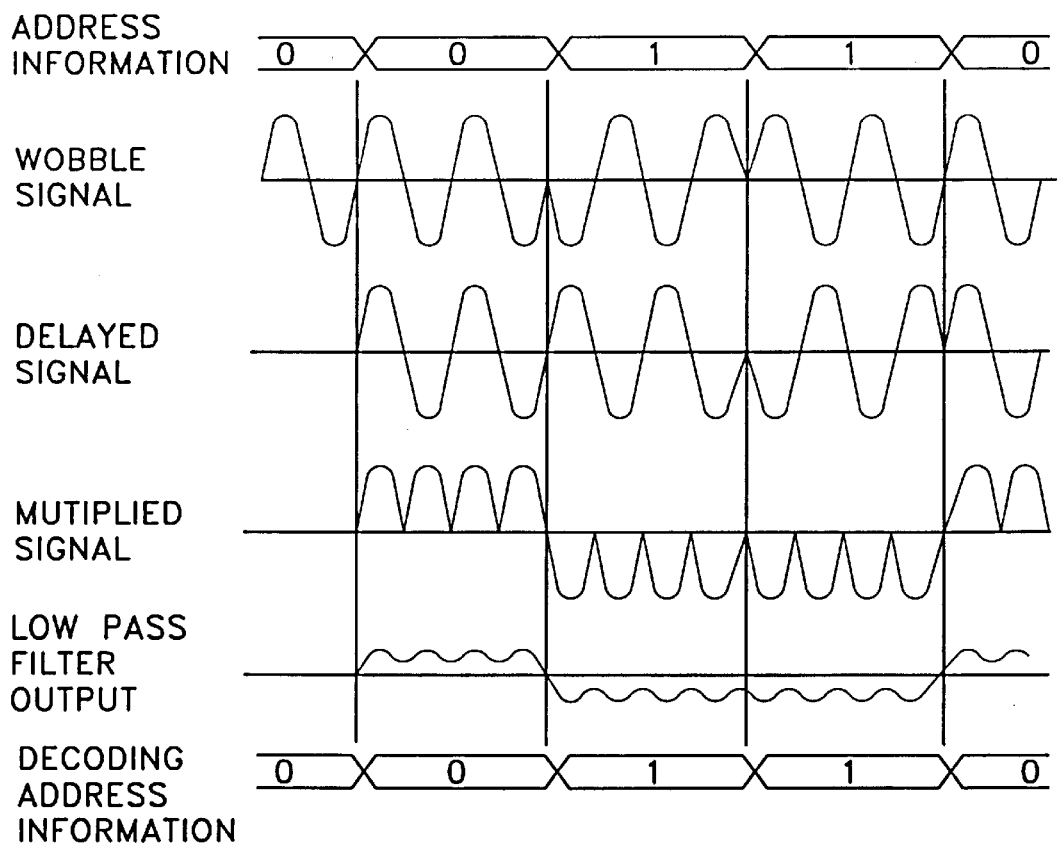
FIG. 8 is a time chart showing the relationship between address information, a wobble signal, a delayed signal, a multiplied signal, a filter output, and a restored result, all in accordance with second embodiment of the present invention.
Figure 9:
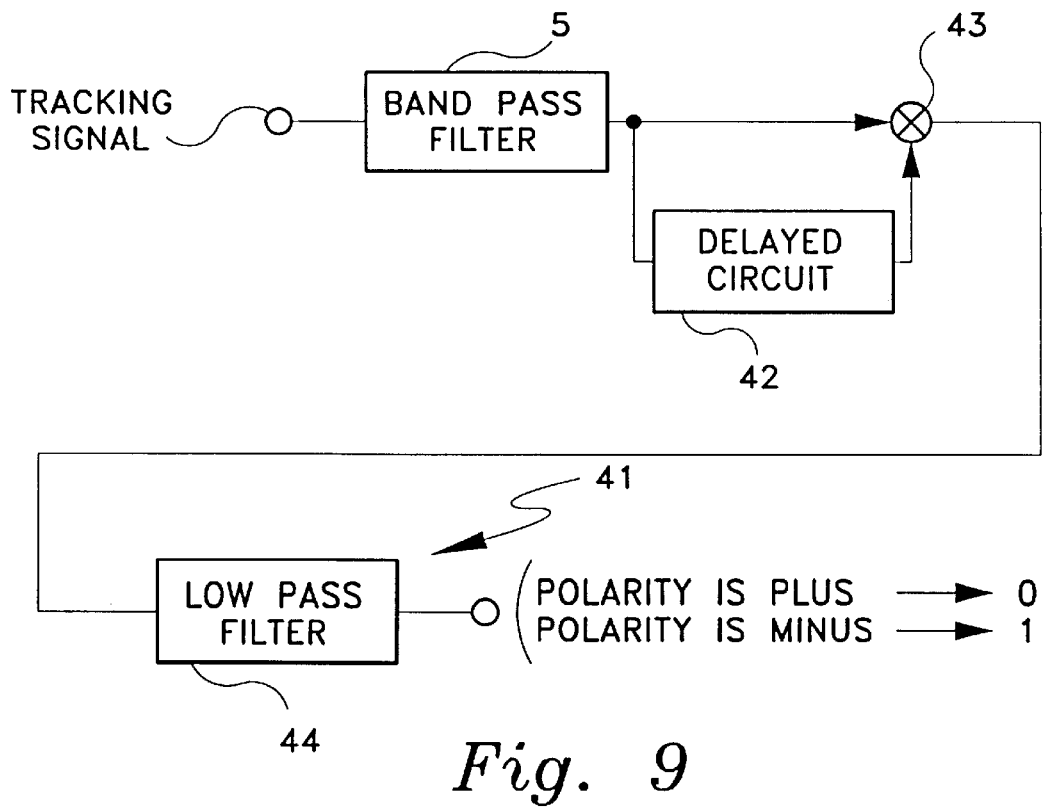
FIG. 9 is a block diagram showing an address reproducing circuit of the optical disc drive in accordance with the second embodiment of the present invention.

A second embodiment of the present invention will be explained next with reference to the FIG. 8 and FIG. 9. In the second embodiment the same portions as in the first embodiment use the same names and the same reference numerals, and a detailed explanation of those parts is therefore omitted.

The optical disc system of the second embodiment composes an optical disc 12 and an optical disc apparatus as well as the above mentioned optical disc system 11 (see FIG. 2). Grooves which become tracks of the optical disc are wobbled in correspondence to the phase modulated wobble signal of the address information.

However, binary data of the address information and the phase of the wobble signal are not in one-to-one correspondence. As shown in FIG. 8, binary data of the address information and the reverse existence of phase of the wobble signal are in one-to-one correspondence. In short, in correspondence to a predetermined one value "1" of the binary data of the address information, the phase of the wobble signal reverses. If the address information is a "0", the phase of the wobble signal does not reverse.

In the optical disc drive which carries out recording or reproducing information on such an optical disc, the principal structure is the same structure as the above mentioned optical disc drive 13. However, as shown FIG. 9, the reproducing circuit 41 has a band pass filter with two separate output lines. One output line is an input to a delay circuit 42. These two lines (containing the non-delayed and delayed output of filter 5) are connected to respective inputs of multiplier circuit 43, and a low pass filter 44 is connected to the output of the multiplier circuit 43.

The band pass filter 5 derives a wobble signal of a special frequency band from the tracking signal. The delay circuit 42, as shown in FIG. 8, delays the wobble signal for a time in correspondence to one bit of the address information. The multiplier circuit 43 multiplies the delayed wobble signal by the non-delayed wobble signal. The low pass filter 44 smoothes the multiplied signal and restores the address information.

In such a structure, the optical disc system of the present embodiment can carry out the recording and reproducing information on the optical disc by the optical disc drive, as well as the above mentioned optical disc system 11.

With the second embodiment, the address reproducing circuit 41 derives a wobble signal of a special frequency band from the tracking signal detected from the optical disc by the band pass filter 5. It divides the wobble signal into two signals, delays one signal for a time corresponding to one bit of the address information in the delay circuit 42. Further, the delayed wobble signal and non-delayed signal are multiplied by the multiplier circuit 43. The multiplied signal is smoothed by the low pass filter 44 and the address information is restored. A monostable multivibrator may be used to sharpen the address information at the output of low pass filter 44.

In the optical disc system of the present invention, as well as the above mentioned optical disc system 11, wobbling of the grooves of the optical disc corresponds to the phase modulated wobble signal of the address information. Therefore, while maintaining a good C/N required for reproducing the address information, it is still possible to shorten the wobbling amplitude of the groove, and to make the pitch of the groove in a high density which increases recording capacity.

In the optical disc of the present embodiment, the binary data of the address information and phase reverse of the wobble signal are in one-to-one correspondence. Therefore, the optical disc drive can speedily reproduce the address information by a simple technique using the address reproducing circuit 41 which has a simple structure. Further, a phase reversal of the wobble signal corresponds to only reproducing of a "1" which is one of the address information binary data. For example, when in the address information reproducing frequency of "1" is high and reproducing frequency of "0" is low, frequency reversal of the phase of the wobble signal becomes low. In short, as wobbling of the grooves is simple, and it is simple to form the grooves.

The cutting apparatus which is an optical disc drive for forming wobbling grooves like this on the original optical disc has only to reverse the phase of the wobble signal in correspondence to one of the predetermined address information binary data bits.

As mentioned above, in accordance with a first structure of the optical disc of the present invention, tracks are wobbled in correspondence to the phase modulated wobble signal of the address information. Therefore, even while shortening the wobbling amplitude of the tracks, the address information can be recovered. Further, it is possible to make the pitch of the track with a high density and increase the recording capacity of the optical disc.

In accordance with another aspect of the optical disc of the present invention, after the address information is converted to a predetermined code, phase modulation is carried out. Therefore, the reproducing frequency of one of the phase modulation or frequency of the carrying wave are adjusted by the code converting, and it is possible to improve design or flexibility of the optical disc.

In accordance with another aspect of the optical disc of the present invention, one bit of the address information corresponds to an integral cycle of the wobble signal. Therefore, the duty ratio of the phase modulated wobble signal containing the address information is constant, and it is possible to convert the address information to the wobble signal directly.

In accordance with another aspect of the optical disc of the present invention, binary data of the address information corresponds to "0" and "180" degree phase of the wobble signal. Therefore, even if the phase of the wobble signal is judged, it is possible to form continuous tracks.

In accordance with another aspect of the optical disc of the present invention, the binary data of the address information and the phase of the wobble signal are in one-to-one correspondence. Therefore, when detecting the phase of the wobble signal, binary data of the address information can be easily detected. Further, when carrying out recording information on the optical disc, it is possible to recover the address information at high speed by a simple circuit.

In accordance with another aspect of the optical disc of the present invention, binary data of the address information and a reverse phase of the wobble signal are in one-to-one correspondence. Therefore, by judging the existence of the phase reverse of the wobble signal, binary data of the address information can be detected. When carrying out recording information on the optical disc, it is possible to recover the address information at high speed by a simple circuit.

In accordance with another aspect of the optical disc of the present invention, the phase of the wobble signal reverses in correspondence to producing of the predetermined one of the binary data bits of the address information. Therefore, by judging the existence of the phase reverse of the wobble signal, it is possible to detect the binary data of the address information. When carrying out recording information on the optical disc, it is possible to recover the address information at high speed by a simple circuit.

In accordance with another aspect of the optical disc of the present invention, the carrier wave frequency of the phase modulation of the address information is located at an intermediate position between a tracking servo band area and a RF signal band area. Therefore, the wobble signal, the tracking error signal and the RF signal do not interfere with each other. When carrying out recording information on the optical disc, it is possible to reliably reproduce each signal.

In accordance with another aspect of the optical disc apparatus of the present invention, an optical disc apparatus has a rotating driving mechanism for rotating an optical disc with wobbled tracks in correspondence to the address information, an optical head for detecting at least a tracking signal by scanning tracks of the rotating optical disc, a band pass filter which derives a wobble signal of a special frequency band from the tracking signal, and a phase detector which restores the address information by detecting the phase of the wobble signal. Therefore, tracks of the optical disc are wobbled in correspondence to the phase modulated wobble signal and contain the address information. If binary data of the address information and phase of the wobble signal are in a one-to-one correspondence, it is possible to derive a wobble signal from the tracking signal of the optical disc and recover the address information.

In accordance with another aspect of the optical disc apparatus of the present invention, the optical disc apparatus has a rotating driving mechanism for rotating an optical disc with tracks wobbled in correspondence to address information, an optical head which detects at least a tracking signal by scanning tracks of the rotating optical disc, a band pass filter which derives a wobble signal of a special frequency band from the tracking signal, a delay circuit which delays the wobble signal only for predetermined time, a multiplier circuit which multiplies a non-delayed wobble signal by the delayed signal, and a low pass filter which smoothes the multiplied signal. Therefore, the tracks of the optical disc which correspond to the phase modulated wobble signal contain the address information. If binary data of the address information and the phase reversal of the wobble signal are in a one-to-one correspondence, it is possible to derive a wobble signal from the tracking signal of the optical disc and recover the address information.

In accordance with another aspect of the optical disc apparatus of the present invention an optical disc apparatus has a rotating driving mechanism for rotating an optical disc, an optical head which forms tracks by scanning the rotating the optical disc, a rotating control circuit which controls the rotating speed of the rotating driving mechanism in correspondence to the track address information so that relative speed between the optical head and the optical disc can be constant, a phase modulator which produces a wobble signal phase modulated with address information of the optical disc track and a head control circuit which moves a scanning position of the optical head in correspondence to the wobble signal in a radial direction of the optical disc. Therefore, it is possible to form tracks wobbled in correspondence to the phase modulated wobble signal of the address information on an optical disc.

In accordance with another aspect of the invention, the phase modulator reverses phase of the wobble signal in correspondence to one of the binary data bits of the address information. Therefore, binary data of the address information and existence of the phase reversal of the wobble signal are in one-to-one correspondence, and it is possible to form wobbled tracks on an optical disc.

While preferred embodiments of the invention have been described and illustrated, the invention is not limited by the foregoing description, but is only limited by the scope of the appended claims.

What is claimed:

1. A manufacturing apparatus for a disc stamper master disc comprising:
   a rotatable driving mechanism for rotating a disc stamper master disc;
   an optical head which forms tracks by scanning said disc stamper master disc rotated by said driving mechanism;
   a rotating control circuit which controls the rotating speed of the rotating driving mechanism in correspondence to the track address information so that relative speed between the optical head and said disc stamper master disc can be constant;
   a phase modulator which produces a wobble signal by modulating the phase of a signal in accordance with prerecorded information of said disc stamper master dis track; and
   a head control circuit which moves the scanning position of the optical head in correspondence to the wobble signal in a radial direction of said disc stamper master disc.

2. A manufacturing apparatus for a disc stamper master disc as claimed in claim 1, wherein the prerecorded information contains binary data and the phase modulator reverses the phase of the wobble signal in correspondence to one of the binary data of the prerecorded information.

3. A method of creating a wobble signal on a disc stamper master disc comprising the steps of:
   phase modulating a generated wobble signal with prerecorded information, wherein one bit of the prerecorded information corresponds to at least one integral cycle of the wobble signal; and
   recording said phase modulated wobble signal as tracks located on the disc stamper master disc.

4. The method of claim 3, wherein the prerecorded information represents a predetermined address code.

5. The method of claim 3, wherein the prerecorded information represents binary data which is in one-to-one correspondence with the phase of the wobble signal.

6. The method of claim 3, wherein the prerecorded information represents binary data which corresponds to either a 0 or 180 degree phase of the wobble signal.

7. The method of claim 3 or 6, wherein the phase of the wobble signal is reversed in correspondence with receipt of a predetermined one of said binary data of the prerecorded information.

8. A method of extracting prerecorded information form a wobble signal phase modulated with said prerecorded information, said phase modulated wobble signal being recorded as tracks of an optical disc, said method comprising the steps of:
   scanning the tracks of an optical disc with an optical head to produce a tracking signal;
   filtering said tracking signal to produce said phase modulated wobble signal;
   delaying a first portion of said phase modulated wobble signal;
   multiplying the delayed first portion of said phase modulated wobble signal by a second non-delayed portion of said phase modulated wobble signal; and
   filtering the multiplied signal in order to obtain a signal representative of said prerecorded information.

9. A manufacturing apparatus for a disc stamper master disc comprising:

a rotatable driving mechanism for rotating a disc stamper master disc;

an optical head which forms tracks by scanning said disc stamper master disc rotated by said driving mechanism, a rotating control circuit which controls the rotating speed of the rotating driving mechanism in correspondence to the track address information so that relative speed between the optical head and said disc stamper master disc can be constant, a phase modulator which produces a wobble signal by modulating the phase of a signal in accordance with prerecorded information of said disc stamper master disc track, wherein one bit of said prerecorded information corresponds to at least one integral cycle of the wobble signal; and a head control circuit which moves the scanning position of the optical head in correspondence to the wobble signal in a radial direction of said disc stamper master disc.

10. A manufacturing apparatus for a disc stamper master disc comprising:

a rotatable driving mechanism for rotating a disc stamper master disc;

an optical head which forms tracks by scanning said disc stamper master disc rotated by said driving mechanism, a rotating control circuit which controls the rotating speed of the rotating driving mechanism in correspondence to the track address information so that relative speed between the optical head and said disc stamper master disc can be constant, a phase modulator which produces a wobble signal by modulating the phase of a signal in accordance with prerecorded information of said disc stamper master disc track, wherein said prerecorded information represents binary data which corresponds to 0 and 180 degree phases of the wobble signal; and a head control circuit which moves the scanning position of the optical head in correspondence to the wobble signal in a radial direction of said disc stamper master disc.

11. A manufacturing apparatus for a disc stamper master disc comprising:

a rotatable driving mechanism for rotating a disc stamper master disc;

an optical head which forms tracks by scanning said disc stamper master disc rotated by said driving mechanism, a rotating control circuit which controls the rotating speed of the rotating driving mechanism in correspondence to the track address information so that relative speed between the optical head and said disc stamper master disc can be constant, a phase modulator which produces a wobble signal by modulating the phase of a signal in accordance with prerecorded information of said disc stamper master disc track, wherein said prerecorded information represents binary data which is in a one-to-one correspondence with the phase of the wobble signal; and a head control circuit which moves the scanning position of the optical head in correspondence to the wobble signal in a radial direction of said disc stamper master disc.

12. A method of creating a wobble signal on a disc stamper master disc comprising the steps of:

phase modulating a generated wobble signal with prerecorded information, wherein said prerecorded information represents binary data which corresponds to 0 and 180 degree phases of the wobble signal;

recording said phase modulated wobble signal as tracks located on the disc stamper master disc.

13. A method of creating a wobble signal on a disc stamper master disc comprising the steps of:

phase modulating a generated wobble signal with prerecorded information, wherein said prerecorded information represents binary data which is in a one-to-one correspondence with the phase of the wobble signal;

recording said phase modulated wobble signal as tracks located on the disc stamper master disc.

* * * * *